Patented July 5, 1949

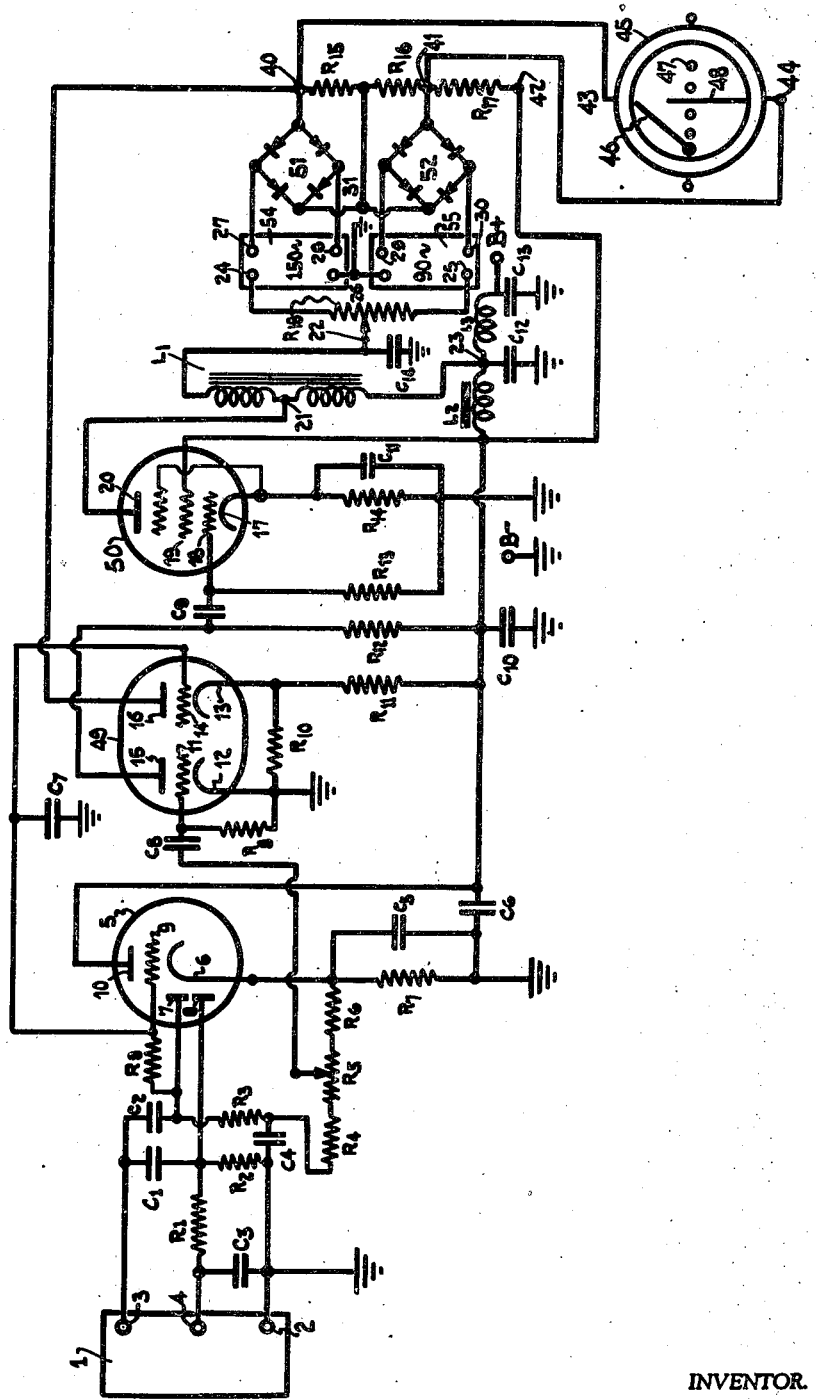

2,475,123

UNITED STATES PATENT OFFICE 2,475,123

AIRCRAFT GLIDE PATH INDICATOR

Arthur Donald Baylor, Cincinnati, Ohio, assignor, by mesne assignments, to Avco Manufacturing Corporation, a corporation of Delaware Application August 7, 1944, Serial No. 548,458

11 Claims. (Cl. 343—108)

This invention relates to radio receiving circuits for indicating the glide path of aircraft and is particularly concerned with a method for causing a vertical glide path indicating meter to read off scale in the "up" direction in the absence of a received signal.

Glide path indicating systems consist of a transmitter on the ground at a landing field and a receiver and indicating device on an airplane. The transmitter simultaneously radiates two directed beams of the same radio frequency but modulated at different audio frequencies such as 90 and 150 cycles per second. The beams are so oriented and adjusted in amplitude that a zone of equal signal strength between the beams defines a suitable glide path for landing a plane on the field. The receiver on the plane picks up, amplifies and detects the two beamed signals and then separates the derived audio components. A rectified direct current is obtained from each audio component and the two currents are applied in opposition to an indicating meter so that when the two signals are of equal strength the needle of the meter is not deflected. For convenience the needle is pivoted at one side of the dial so that it is in a horizontal position for zero reading. When the plane is flying below the desired glide path the signal from the lower of the two beams will be the stronger and the meter needle will swing upward indicating that the gliding angle should be reduced. The reverse action occurs when the plane is too high. A difficulty is encountered if it should happen that the transmitter fails to radiate the beamed signals, for in this case the meter needle will occupy the horizontal position thus falsely indicating that the plane is in the glide path. This invention is particularly concerned with a method and means for causing the meter to indicate the absence of the glide path signal by an off scale reading in the "up" direction. This result is accomplished by an arrangement which causes the plate current of an auxiliary electron tube to energize the meter in the absence of the glide signal and by providing circuit arrangements which act to cut off the plate current of the tube whenever an appreciable amount of signal is received.

In receivers of this type a considerable gain in simplicity and convenience is secured if all supply currents are obtained directly from the 24 volt storage battery, a usual aircraft accessory. Because of the relatively low value of the "B" voltage, it is difficult to develop sufficient biasing voltage to properly control the auxiliary tube referred to above. With the particular circuit arrangement of the present invention an ample biasing voltage for the purpose described is obtained.

The novel features that I consider characteristic of my invention are set forth in the appended claims; the invention itself, however, both as to its organization and method of operation together with additional objects and advantages thereof will best be understood from the following description of specific embodiments when read in conjunction with the accompanying drawings in which is shown an exemplary circuit of that part of a glide path receiver with which the invention is concerned including a representation of the indicating meter. Component values which have been found to be suitable for this circuit are enumerated in the following table:

5. Vacuum tube, type 12SR7
45. Meter, Signal Corps type 101
49. Vacuum tube, type 12SN7GT
50. Vacuum tube, type 28D7 with the two sections connected in parallel

| | |
|---|---|
| C1, 270 m. m. f. | R3, 0.33 megohms |
| C2, 270 m. m. f. | R4, 1.0 megohms |
| C3, 0.1 m. f. | R5, 1.0 megohms |
| C4, 50 m. m. f. | R6, 0.15 megohms |
| C5, 0.001 m. f. | R7, 0.056 megohms |
| C6, 0.001 m. f. | R8, 10.0 megohms |
| C7, 0.1 m. f. | R9, 10.0 megohms |
| C8, 0.01 m. f. | R10, 300 ohms |
| C9, 0.25 m. f. | R11, 2700 ohms |
| C10, 50 m. f. | R12, 0.1 megohms |
| C11, 100 m. f. | R13, 0.1 megohms |
| C12, 0.001 m. f. | R14, 180 ohms |
| C13, 0.001 m. f. | R15, 3900 ohms |
| C14, 0.1 m. f. | R16, 3900 ohms |
| R1, 3.3 megohms | R17, 10000 ohms |
| R2, 1.0 megohms | R18, 5000 ohms |

In the drawing it is assumed that the receiver is of the superheterodyne type suitable for the high frequencies employed in systems of this kind. 1 represents the intermediate frequency amplifier of such a receiver. It is assumed that the composite signal from the double beamed transmitter mentioned above has been picked up by the antenna system of the receiver and that high frequency signal has been converted to a lower intermediate frequency by well known methods employed in superheterodyne receivers. The amplified I. F. signal voltage is developed between terminals 2 and 3 of the drawing and is impressed on the diode plates 7 and 8 of the double diode-triode 5 thru the condensers $C_1$ and $C_2$. The cathode 6 is at substantially ground potential for I. F.

currents because of the by pass condenser $C_5$. Terminal 2 is grounded directly.

The voltage developed by diode plate 8 across resistor $R_2$ is supplied thru the filter $R_1$ and $C_3$ to terminal 4 of the I. F. amplifier 1 for the automatic regulation of the gain of this amplifier.

A portion of the audio frequency component of the voltage developed by diode plate 7 across the first impedance comprising resistors $R_3$, $R_4$, $R_5$ and $R_6$ is supplied thru the adjustable contact of $R_5$ thru $C_8$ to the grid 11 of the double triode 49. The direct current component of the voltage developed by diode plate 7 is impressed thru the filter $R_3$ and $C_7$ upon the grid 9 of tube 5 and the grid 14 of tube 49 producing a negative potential of such magnitude between grid 14 and cathode 13 of tube 49 as to cut off the current in the circuit of plate 16 of this tube. Elements 13, 14 and 16 are hereinafter collectively referred to as "the first valve." They are also referred to as "the alarm tube," because it is the function of this tube to cause meter 45 to read off scale in the "up direction" when this tube is conductive. It will be seen that this tube functions as a relay. The result sought by the present invention is to cut off this relay in the absence of received R. F. signals. The method and means by which this result is accomplished is one of the objects of this invention and will be later described.

The audio signal impressed on grid 11 of tube 49, as described, appears in greater magnitude in the circuit of plate 15 of this tube and is impressed thru $C_9$ on grid 18 of pentode 50. The plate 20 of this tube is coupled thru autotransformer $L_1$ to adjustable contact 22 of Resistor $R_{18}$. The condenser $C_{14}$ serves to resonate $L_1$ at a low frequency improving the transmission of the 90 and 150 cycle transmission while reducing that of distortion and noise components. The ends of resistor $R_{18}$ are connected to terminals 24 and 25 of the audio filter circuits 54 and 55. These filters contain transformers so that there is no conductive connection between their input and output circuits. These latter are connected as shown to the bridge type rectifiers 51 and 52. The rectified output of 51 and 52 is impressed in opposed polarity on Resistors $R_{15}$ and $R_{16}$ as shown. The voltage developed between terminals 40 and 41 is impressed on indicating meter 45 thru connection 43 and 44.

In the presence of the composite signal from the transmitter of the glide path indicator system the needle 46 of meter 45 will indicate the position of the aircraft relative to the glide path as previously described. Needle 48 is operated by a runway localizer system which is not a part of this invention. In the absence of the composite signal rectifiers 51 and 52 will develop no voltage and needle 46 would if no special precautions were taken, return to the zero or horizontal position marked by the row of dots 47, thus falsely indicating that the aircraft is in the glide path. Such a false indication is eliminated, however, by the action of the tubes 5 and 49 which will now be described.

In the absence of an R. F. signal, diode or rectifier plate 7 of tube 5 will develop only a small negative voltage, commonly called contact potential, with respect to its cathode 6 across the first impedance $R_3$—$R_6$. Grid 9 is connected thru $R_8$ to diode plate or anode 7. Current will flow in the circuit of plate 10 developing a voltage across the second impedance or cathode resistor $R_7$ which causes cathode 6 to assume a positive potential of the order of five volts with respect to ground. Cathode 13 of tube 49 is maintained approximately three volts above ground potential by the arrangement of resistors $R_{10}$ and $R_{11}$, $R_{11}$ being connected through a series pair of chokes $L_2$, $L_3$ to the positive terminal of the space current source, which terminal is designated +B. With the grid 14 of tube 49 connected to grid 9 of tube 5 and with the circuit as shown and described grid 14 will be at least as high in positive potential as its cathode 13 and current will flow in its plate circuit 16 thru resistors $R_{15}$ and $R_{16}$ and cause needle 46 of meter 45 to read off scale in the "up" direction. These conditions exist during the absence of R. F. signals.

However, in the presence of an R. F. signal a negative voltage is developed between diode plate 7 and cathode 6 of tube 5 across the first impedance $R_3$–$R_6$. This negative voltage tends to render grid 14 more negative. Since grid 9 is connected to plate 7 thru $R_8$ the current in the circuit of plate 10 of the second valve 6, 9, 10 will fall to a small value so that cathode 6 will be practically at ground potential. In other words the voltage across the second impedance $R_7$ becomes less positive and tends to render grid 14 less positive. Diode plate 7 and grid 9 of tube 5 and grid 14 of tube 49 will be negative with respect to ground by a voltage approximately equal to that developed by diode plate 7 with respect to its cathode 6. Since the cathode 13 of tube 49 remains fixed at a positive potential with respect to ground, grid 14 of this tube will be negative with respect to its cathode 13 by an amount equal to the sum of the voltage from diode plate 7 of tube 5 to ground and the voltage from cathode 13 of tube 49 to ground. It will be noted that both the first impedance $R_3$—$R_6$ and the second impedance $R_7$ are connected in series as a biasing network in the circuit of grid 14. The negative voltage developed across the first impedance and the less positive voltage developed across the second impedance in the presence of an R. F. signal cooperate to cut off the first valve 13, 14, 16. This potential is amply sufficient to reduce the current in plate circuit 16 of tube 49 to zero so that the position of needle 46 of meter 45 is controlled by the potentials developed by rectifiers 51 and 52 only.

With the receiver operating on 24 volts plate supply it has not been found possible to develop a voltage on diode 7 of tube 5 sufficient to completely cut off the plate current of a tube having enough plate current at zero bias to throw the meter off scale. However, with the arrangement and circuit of this invention more than sufficient bias is developed to control the plate current of a tube having ample capacity at zero bias to throw the meter off scale. This voltage is developed with a signal strength of less magnitude than that encountered in normal operation.

Circuit components not mentioned specifically in the foregoing description perform functions well understood by those skilled in the art. The heater circuits of the various electron tubes are not shown in the drawing. The heaters are energized by the 24 volt battery supply and are connected in series in suitable groups with or without series resistors as may be required.

There has been no attempt to illustrate more than one embodiment of the invention, and in the claims that follow the novelty inherent in the illustrated form, as well as other forms which could readily be devised once the invention is appreciated, will be duly set forth.

Having thus described the invention what I claim as new and desire to be secured by Letters Patent is:

1. In an aircraft glide path indicating system, a radio receiver, a relay-controlled indicating meter, and means for causing said meter to read off scale in the absence of a signal and on scale in the presence of a signal, said means comprising a diode for developing a D. C. potential between its anode and cathode proportional to the magnitude of the signal impressed thereon, and means comprising a triode having its grid connected with the anode of said diode, its cathode connected to the cathode of said diode and a resistance between said cathodes and the minus "B" terminal of said receiver, said second mentioned means maintaining the cathode of said diode at a positive potential with respect to the said minus "B" terminal in the absence of said signal and at substantially zero potential in the presence of said signal, said triode being controlled by said diode, the potential developed by said diode and the potential of said cathode cooperating in series to cut off the relay in the presence of a signal.

2. In an aircraft glide path indicating system, a radio receiver, an indicating meter, and means for causing said meter to read off scale in the absence of a signal and on scale in the presence of a signal, said means including an alarm tube and means for cutting off said tube comprising a diode for developing a D. C. potential between its anode and cathode proportional to the magnitude of the signal impressed thereon, a network coupled to said alarm tube across which said potential is developed, a grid controlled electron discharge tube having its cathode at the same potential as or common to the cathode of said diode, a resistor connected between said cathodes and the minus "B" terminal of said receiver and a conductive connection between said grid and the anode of said diode for maintaining said cathode at substantially zero potential in the presence of said signal.

3. In a glide path receiver having an indicating meter and having the negative terminal of the "B" circuit supply source connected to the receiver ground, and means effective for causing said meter to read off scale in the absence of a signal and being inoperative to effect said meter in the presence of a signal said means comprising a grid controlled electron discharge tube with cathode maintained at a positive potential above said ground and having said meter in its anode circuit, a diode and a second grid controlled discharge tube having their cathodes common or at the same potential and connected to ground thru a resistor, a resistor between the plate and cathode of the diode for developing a D. C. voltage proportional to the signal impressed on said diode and a conductive connection between the plate of said diode and the grids of said discharge tubes.

4. In a receiver for an aircraft glide path indicating system, said receiver responsive to a duplex composite signal and having an indicating meter actuated by voltage derived from a pair of bridge type rectifiers connected in series opposition, a pair of filter circuits for the selection of one of the duplex signal components for each of said rectifiers, said filter circuits having output terminals insulated from the input terminals of said filters, means for causing said meter to read off scale in the absence of said signal said means ineffective upon said meter in the presence of said signal, said means comprising an electron emitting tube having a grid, a cathode and an anode with a conductive circuit between the anode and cathode, said circuit including said indicating meter, a pair of resistors for maintaining said cathode positive with respect to the "B" minus terminal of said receiver, a diode having anode and cathode and arranged to produce a D. C. potential between its anode and cathode proportional to the signal impressed on said diode, a second electron emitting tube having cathode, grid and anode, a conductive connection between the cathode of said diode and the cathode of said second tube, a resistor connected from said cathodes to said "B" minus terminal and a conductive connection between the anode of said diode and the anodes of said first and second tubes.

5. A device for responding to radio-frequency signals for applying a biasing potential to the control electrode of a first electron valve, comprising at least two series-connected impedances in the control electrode circuit of said first valve, a rectifier across one of said impedances for responding to said R. F. signals to develop a negative biasing potential for said first valve, and a second electron valve having a cathode-anode circuit in series with the other of said impedances and a control electrode coupled to the anode of said rectifier, said second electron valve developing a positive biasing potential for said first valve, the sum of said positive and negative bias potentials being the resultant bias applied to said first valve, said positive bias decreasing as said negative bias increases, whereby the device responds to radio-frequency signals to apply two distinct potentials tending to cut off said first valve.

6. A device for responding to radio-frequency signals for applying a biasing potential to the control electrode of a first electron valve, comprising at least two series-connected impedances in the control electrode circuit of said valve, means responsive to R. F. signals for developing across one of said impedances a negative biasing potential for said first valve, and means for developing across the other impedance a positive biasing potential for said first valve, the last-mentioned means being coupled to and controlled by the first-mentioned means to decrease said positive potential in the presence of R. F. signals, the sum of said positive and negative bias potentials being the resultant bias applied to said first valve, said positive bias decreasing as said negative bias increases, whereby the device responds to radio-frequency signals to apply two distinct potentials tending to cut off said first valve.

7. A device for responding to radio-frequency signals for applying a biasing potential to the control electrode of a first electron valve, comprising at least two series-connected impedances in the control electrode circuit of said valve, diode means responsive to R. F. signals for developing across one of said impedances a negative biasing potential for said first valve, and triode means utilizing the other impedance as a cathode bias impedance for developing across said other impedance a positive biasing potential for said first valve, the triode means being coupled to and controlled by the diode means to become less conductive and to decrease said positive potential in the presence of R. F. signals, the sum of said positive and negative bias potentials being the resultant bias applied to said first valve, said positive bias decreasing as said negative bias increases, whereby the device responds to radio-frequency signals to apply two distinct potentials tending to cut off said first valve.

8. In a glide-path indicator of the type including an alarm tube, a device for responding to radio-frequency signals for applying a cut-off biasing potential to the control electrode of said alarm tube, comprising at least two series-connected resistances in the control-electrode circuit of said alarm tube, a rectifier across one of said resistances for responding to said R. F. signals to develop a negative biasing potential for said alarm tube and a second electron valve having a cathode-anode circuit in series with the other of said impedances and a control electrode coupled to the anode of said rectifier, said second electron valve developing a positive biasing potential for said alarm tube control electrode, the sum of said positive and negative bias potentials being the resultant bias applied to said alarm tube, said positive bias decreasing as said negative bias increases, whereby the device responds to radio-frequency signals to apply two distinct potentials cutting off said alarm tube.

9. A device for responding to radio-frequency signals for applying a biasing potential to the control electrode of a first electron valve, comprising a pair of series-connected impedances in the control-electrode circuit of said first valve, a rectifier across one of said impedances for responding to said R. F. signals to develop a negative biasing potential for said first valve, a second electron valve having a cathode-anode circuit in series with the other of said impedances and a control electrode coupled to the anode of said rectifier, said second electron valve developing a positive biasing potential for said first valve, the sum of said positive and negative bias potentials being the resultant bias applied to said first valve, said positive bias decreasing as said negative bias increases, whereby the device responds to radio-frequency signals to apply two distinct potentials tending to cut off said first valve, and a filter network including a resistor in series with said impedances for filtering said potentials as applied to said first valve.

10. A device for responding to radio-frequency signals for developing a biasing potential, comprising a biasing network consisting of a pair of series-connected impedances, a rectifier across one of said impedances for responding to said R. F. signals to develop a negative biasing potential, an electron valve having a cathode-anode circuit in series with the other of said impedances and a control electrode coupled to the anode of said rectifier, said valve developing a positive biasing potential, the sum of said positive and negative bias potentials being the resulting bias developed by said device, said positive bias decreasing as said negative bias increases, whereby the device responds to radio-frequency signals to develop two cooperating potentials in said network.

11. A device for responding to A. C. signals for developing a biasing potential, comprising a network consisting of a pair of series-connected impedances, a rectifier across one of said impedances for responding to said signals to develop one biasing potential, an electron valve having a cathode-anode circuit in series with the other of said impedances and a control electrode coupled to one electrode of said rectifier, said valve developing another biasing potential across the other of said impedances, the sum of said bias potentials being the resultant bias developed by said device, whereby the device responds to radio-frequency signals to apply two distinct potentials in said network.

ARTHUR DONALD BAYLOR.

REFERENCES CITED

The following references are of record in the file of this patent:

UNITED STATES PATENTS

| Number | Name | Date |
|---|---|---|
| 2,119,530 | Dunmore | June 7, 1938 |
| 2,127,954 | Dunmore | Aug. 23, 1938 |
| 2,345,011 | Sias | Mar. 28, 1944 |